(12) United States Patent
Kuo et al.

(10) Patent No.: US 7,101,074 B2
(45) Date of Patent: Sep. 5, 2006

(54) BACK LIGHT MODULE AND LIQUID CRYSTAL DISPLAY

(75) Inventors: Chien-Hung Kuo, Taichung (TW); Chuan-Pei Yu, Ilan (TW); Han-Chou Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 60 days.

(21) Appl. No.: 10/708,352

(22) Filed: Feb. 26, 2004

(65) Prior Publication Data

US 2004/0228111 A1    Nov. 18, 2004

(30) Foreign Application Priority Data

May 13, 2003    (TW)    ................. 92112902 A

(51) Int. Cl.
*G01D 11/28*    (2006.01)
*F21V 7/04*    (2006.01)

(52) U.S. Cl. .................. 362/634; 362/632; 362/606

(58) Field of Classification Search ................ 362/600, 362/606, 603, 607, 633, 632, 634, 29, 30
See application file for complete search history.

(56) References Cited

U.S. PATENT DOCUMENTS 6,974,221 B1* 12/2005 Wu et al. ................. 362/29

2002/0044437 A1* 4/2002 Lee ........................... 362/31
2003/0112626 A1* 6/2003 Yoo et al. ................. 362/225
2004/0257792 A1* 12/2004 Yu et al. ..................... 362/31

FOREIGN PATENT DOCUMENTS

JP    2001-318614    11/2001

* cited by examiner

*Primary Examiner*—Sandra O'Shea
*Assistant Examiner*—Anabel Ton
(74) *Attorney, Agent, or Firm*—Jianq Chyun IP Office

(57) ABSTRACT

A back light module is disclosed. The back light module comprises a frame, a reflecting plate, at least a lamp, a diffusion plate, a plurality of optical films and at least a supporting element. The reflecting plate is set up on the bottom section of the frame. The lamp is set within the frame above the reflecting plate. The diffusion plate is set over the frame above the lamp. The optical films are set over the diffusion plate. The supporting element is set on the reflecting plate. Each supporting element has a first supporting section and a second supporting section. The first supporting section and the second supporting section individually support the diffusion plate and the lamp.

18 Claims, 5 Drawing Sheets

BACK LIGHT MODULE AND LIQUID CRYSTAL DISPLAY

CROSS REFERENCE TO RELATED APPLICATIONS

This application claims the priority benefit of Taiwan application serial no. 92112902, filed May 13, 2003.

BACKGROUND OF INVENTION

1. Field of the Invention

The present invention relates to a back light module and a liquid crystal display comprising the same. More particularly, the present invention relates to a back light module with special supports for both the diffusion plate and lamp to prevent their deformation and a liquid crystal display comprising the same.

2. Description of the Related Art

To match the life style of modern people, video or imaging equipment is becoming lighter and slimmer. Although the conventional cathode ray tube (CRT) display has many advantages, the design of the electron gun renders it heavy and bulky. Moreover, there is always some risk of hurting viewer's eyes due to certain radiation emitted by the CRT. With big leaps in the techniques in manufacturing semiconductor devices and electro-optics devices, flat panel displays such as liquid crystal displays (LCD), organic light-emitting displays (OLED) and plasma display panel (PDP) have gradually become mainstream display products.

A liquid crystal display can be roughly classified into three types, namely, reflection LCD, transmissive LCD and transflective LCD. Using a transmission or a transflective LCD as an example, the LCD mainly comprises a liquid crystal panel and a back light module. The liquid crystal panel furthermore comprises a liquid crystal layer sandwiched between two transparent substrates. The back light module provides a surface light source to illuminate the liquid crystal panel for displaying images.

FIG. 1 is a cross-sectional view of a conventional straight down back light module. As shown in FIG. 1, the back light module 100 comprises a frame 102, a reflecting plate 104, at least a lamp 106, a diffusion plate 108, an optical film 110 and at least a supporting column 112. The reflecting plate 104 is set on the bottom interior surface of the frame 102. The lamp 106 is set within the frame 102. The diffusion plate 108 is positioned over the frame 102. The optical film 110 is set over the diffusion plate 108. The supporting column 112 is positioned within the frame 102 between the diffusion plate 108 and the lamp 106. Through the supporting column 112, the diffusion plate 108 is prevented from twisting deformation that might lead to a change in the optical characteristics of the back light module 100.

FIG. 2 is a cross-sectional view of another conventional straight down back light module. As shown in FIG. 2, the back light module 200 comprises a frame 202, a reflecting plate 204, at least a lamp 206, a diffusion plate 208, an optical film 210 and at least a base stand 212. The reflecting plate 204 is set on the bottom interior surface of the frame 202. The lamp 206 is set within the frame 202. The diffusion plate 208 is positioned over the frame 202. The optical film 210 is set over the diffusion plate 208. The base stand 212 is attached to the frame 202 underneath the lamp 206. Using the base stand 212 to support the lamp 206, possible deformation of the lamp 206 that might lead to a change in the optical characteristics of the back light module 200 is prevented.

Although the supporting column 112 inside the back light module 100 in FIG. 1 is able to support the diffusion plate 108 and prevent distortion, the lamp 106 cannot be supported by any elements. When the size of the liquid crystal panel is increased, the dimension of the lamp 106 will also correspondingly increase so that the lamp 106 may sag due to insufficient stiffness. Thus, there will be some possible changes in the optical performance of the back light module 100.

On the other hand, although the base stand 212 within the back light module 200 in FIG. 2 is able to support the lamp 206 against sagging deformation, there is no specific structural support for the diffusion plate 208. When the size of the liquid crystal display panel is increased, dimension of the diffusion plate 208 will also correspondingly increase so that the diffusion plate 208 may warp due to insufficient stiffness or thermal expansion. Hence, there will be some possible changes in the optical performance of the back light module 200.

SUMMARY OF INVENTION

Accordingly, one object of the present invention is to provide a back light module and a liquid crystal display having internal supporting structures capable of preventing any warping of internal diffusion plate and lamp so that the desired optical characteristics are maintained.

To achieve these and other advantages and in accordance with the purpose of the invention, as embodied and broadly described herein, the invention provides a back light module. The back light module mainly comprises a frame, a reflecting plate, at least a lamp, a diffusion plate, a plurality of optical films and at least a supporting element. The reflecting plate is set on the bottom section of the frame. The lamp is set within the frame above the reflecting plate. The diffusion plate is set over the frame above the lamp. The optical films are set over the diffusion plate. The supporting element is set on the reflecting plate. Each supporting element has a first supporting section and a second supporting section. The first supporting section and the second supporting section individually support the diffusion plate and the lamp.

This invention also provides a liquid crystal display comprising a back light module, a liquid crystal panel and a second frame. The back light module mainly comprises a first frame, a reflecting plate, at least a lamp, a diffusion plate, a plurality of optical films and at least a supporting element. The reflecting plate is set on the bottom section of the first frame. The lamp is set within the first frame above the reflecting plate. The diffusion plate is set over the first frame above the lamp. The optical films are set over the diffusion plate. The supporting element is set on the reflecting plate. Each supporting element has a first supporting section and a second supporting section. The first supporting section and the second supporting section individually support the diffusion plate and the lamp. The second frame is set over the first frame covering the edges of the liquid crystal panel.

In the aforementioned back light module and liquid crystal display, the first supporting section separates from the diffusion plate by a minute distance. Similarly, the second supporting section separates from the lamp by a minute distance.

Through the attachment of a plurality of supporting elements on the reflecting plate on the frame, both the diffusion plate and the lamp are simultaneously supported. With a reduction in the degree of warping or distortion of the diffusion plate and the lamp, optical characteristics of the back light module or the liquid crystal display can be maintained.

Furthermore, a minute gap is set aside between the supporting element and the lamp as well as between the supporting element and the diffusion plate so that possible distortion of the lamp and the diffusion plate resulting from a thermal expansion/contraction of the supporting elements can be effectively prevented.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
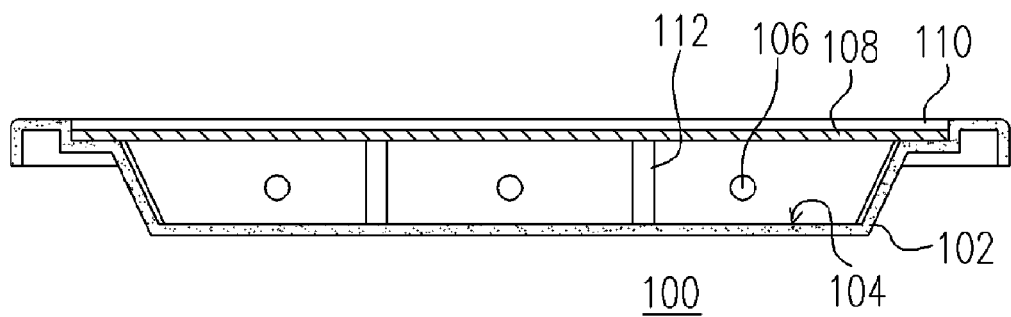
FIG. 1 is a cross-sectional view of a conventional straight down back light module.
Figure 2:
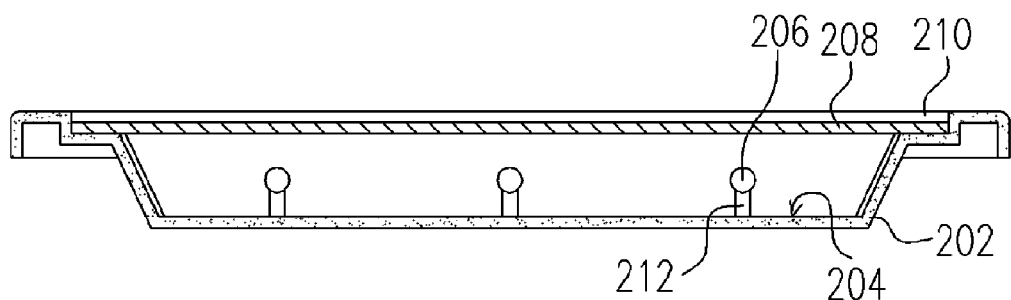
FIG. 2 is a cross-sectional view of another conventional straight down back light module.

Reference will now be made in detail to the present preferred embodiments of the invention, examples of which are illustrated in the accompanying drawings. Wherever possible, the same reference numbers are used in the drawings and the description to refer to the same or like parts.

Figure 3:
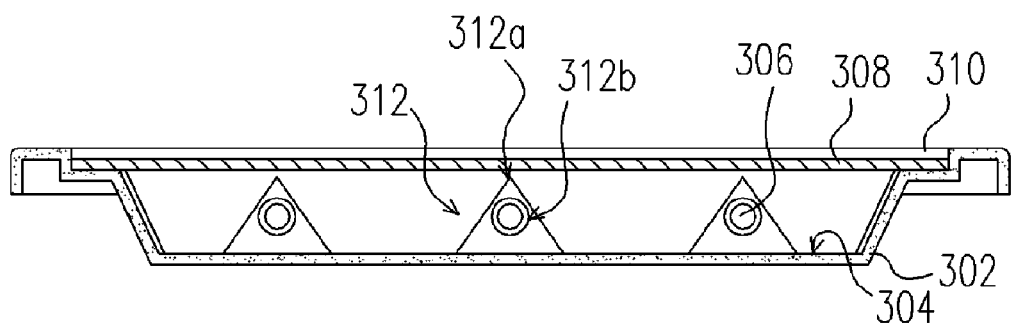
FIG. 3 is a cross-sectional view of a back light module according to one preferred embodiment of this invention.
Figure 4:
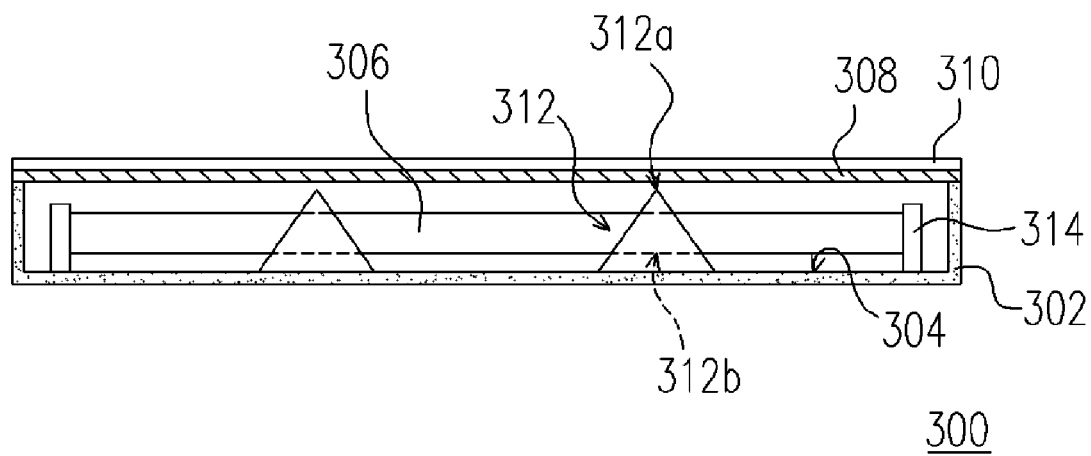
FIG. 4 is a cross-sectional view of a back light module along a direction perpendicular to one shown in FIG. 3.

FIG. 3 is a cross-sectional view of a back light module according to one preferred embodiment of this invention. FIG. 4 is a cross-sectional view of a back light module taken along a direction perpendicular to one shown in FIG. 3. As shown in FIGS. 3 and 4, the back light module 300 of this invention mainly comprises a frame 302, a reflecting plate 304, at least a lamp 306, a diffusion plate 308, a plurality of optical films 310 and at least a supporting element 312.

The reflecting plate 304 is set on the bottom surface of the frame 302. The reflecting plate 304 reflects light heading in a direction just opposite to the display panel (not shown) so that overall light utilization of the lamp 306 is improved. The lamp 306 is set within the frame 203 above the reflecting plate 304 as shown in FIG. 4. The lamp 306 is clamped and fixed in position by two lamp stands 314, for example. The diffusion plate 308 is set over the frame 302 and the lamp 306. The optical films 310 are set over the diffusion plate 308. The optical films 310 include diffusion plates, light-enhancing plates or prism plates, for example.

The supporting element 312 is positioned between the reflecting plate 304 and the diffusion plate 308. Each supporting element 312 has at least a first supporting section 312a and a second supporting section 312b. The first supporting section 312a supports the diffusion plate 308 while the second supporting section 312b supports the lamp 306. The supporting elements 312 can be fabricated using a transparent material such as PMMA so that the supporting elements 312 will not affect the optical characteristics of light emitted from the lamp 306.

In the embodiment of this invention, the transparent supporting element 312 is formed as an integral unit with a conical-shaped body. The upper section of the conical body is the first supporting section 312a of the supporting element 312. The conical-shaped body also comprises a through hole in the middle. The through hole is the second supporting section 312b of the supporting element 312 such that the lamp 306 passes through the hole when the supporting element 312 is properly installed inside the frame 302. Thus, by positioning the supporting elements 312 at suitable locations on the frame 302, both the lamp 306 and the diffusion plate 308 are supported to prevent any warping or distortion.

It is to be note that the upper section (the first supporting section 312a) of the conical-shaped body separates from the diffusion plate 308 by a minute gap and that the interior diameter of the through hole (the second supporting section 312b) is slightly larger than the outer diameter of the lamp 306. This design prevents the supporting element 312 from distorting the lamp 306 or the diffusion plate 308 due to thermal expansion/contraction.

Figure 5:
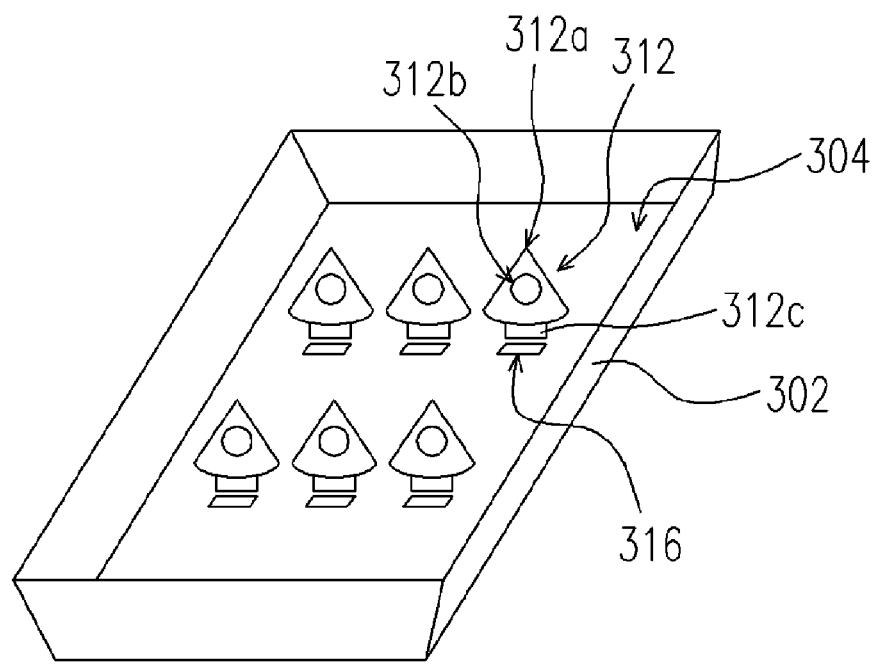
FIG. 5 is a perspective view showing the supporting elements on the reflecting plate inside a back light module according to one preferred embodiment of this invention.

FIG. 5 is a perspective view showing the supporting elements on the reflecting plate inside a back light module according to one preferred embodiment of this invention. Aside from the first supporting section 312a and the second supporting section 312b, the supporting element 312 of this invention also includes an attachment section 312c. The attachment section 312c joins with the bottom section of the supporting element 312. As shown in FIG. 5, the reflecting plate 304 has a corresponding groove 316 at the locations for inserting the attachment section 312c of the supporting element 312. After inserting of the attachment section 312c of the supporting element 312 into the groove 316, thermal glue is applied so that the supporting element is firmly attached to the reflecting plate 304.

Aside from using thermal glue, other methods can also be used to fasten the supporting elements 312 to the reflecting plate 304. For example, in FIGS. 6 and 7, the attachment section 312d or 312e of the supporting element 312 is designed into a wedge so that the supporting element 312 can be tightly locked onto the reflecting plate 304. Similarly, in FIG. 8, a screw that passes through the frame 302 may be used to tighten with the attachment section 312c of the supporting element 312.

Figure 9:
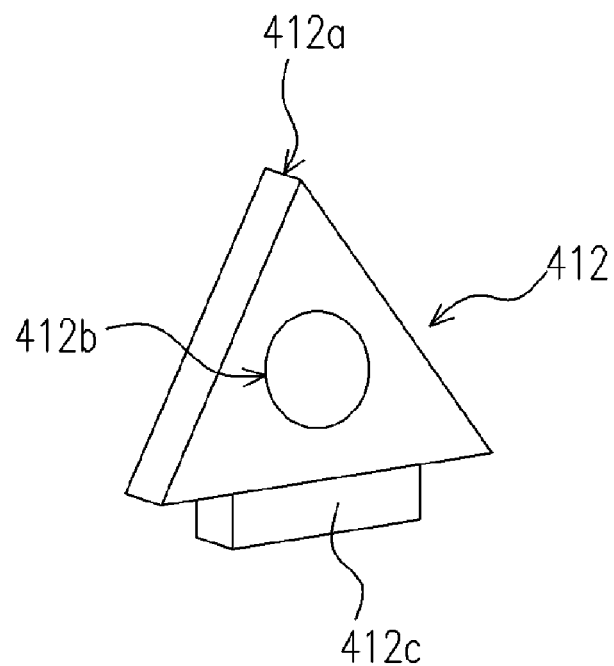
FIG. 9 is a perspective view showing the structure of a supporting element according to one preferred embodiment of this invention.
Figure 10:
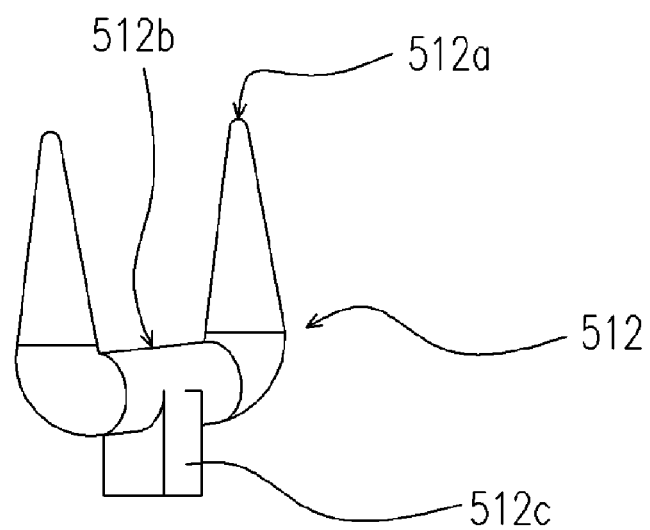
FIG. 10 is a perspective view showing the structure of a supporting element according to another preferred embodiment of this invention.

In addition, the shape of the supporting element 312 is not restricted to a conical body as disclosed. For example, the supporting element as shown in FIG. 9 may also have a thin triangular shape. With this configuration, the effect of the supporting element 412 on the light emitted from the lamp 306 will be reduced. In FIG. 10, a U-shaped supporting element 512 with conical branches is shown. As shown in FIG. 10, the interior surface (the second supporting section 512b) of the U-shaped supporting element 512 supports a lamp while the upper end (the first supporting section 512a) of the conical branch of the U-shaped supporting element 512 supports the diffusion plate 308. Since lamp tubes 306 no longer have to pass through a through hole during assembly, the installation or exchange of lamp tubes 306 is very much simplified.

Although three types of supporting elements (in FIGS. 3, 9 and 10) having a different shape and structure have been described in the aforementioned embodiments, this by no means exclude all the possible configurations of the supporting elements. Any type of supporting elements capable of supporting both the diffusion plate 308 and the lamp 306 at the same time is within the spirit and scope of this invention.

Figure 11:
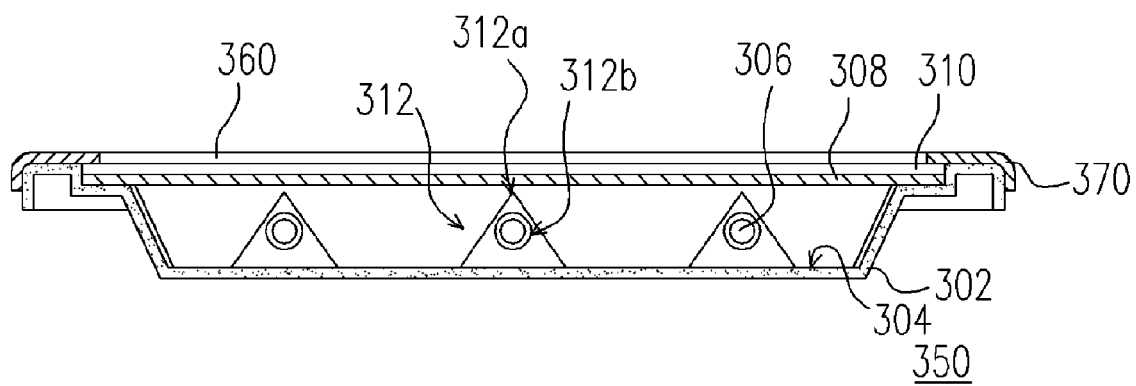
FIG. 11 is a cross-sectional view of a liquid crystal display according to one preferred embodiment of this invention.

FIG. 11 is a cross-sectional view of a liquid crystal display according to one preferred embodiment of this invention. As shown in FIG. 11, the liquid crystal display 350 of this invention is constructed by assembling a back light module 300, a liquid crystal panel 360 and a frame 370 together. The liquid crystal panel 360 is an active matrix liquid crystal panel comprising a thin film transistor (TFT) array, a color-filtering substrate and a liquid crystal layer, for example. The liquid crystal panel 360 is set up over the optical films 310 above the frame 302. The frame 370 covers the side edges of the liquid crystal panel 360 so that the liquid crystal panel 360 is sandwiched between the upper frame 370 and the lower frame 302. Thereafter, the frames are locked together by passing screws through the upper frame 370 and with corresponding threaded holes in the lower frame 302.

Figure 6:
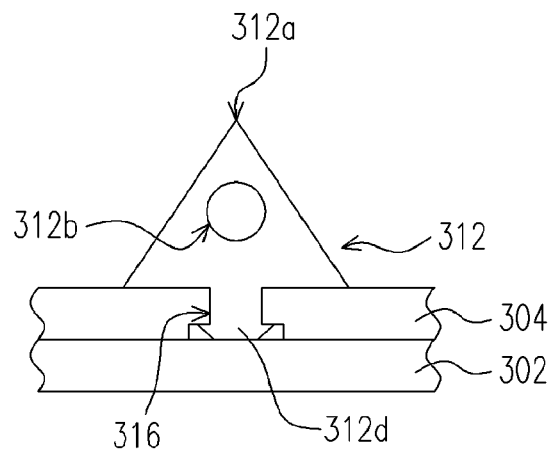
FIG. 6 is a sectional diagram showing the attachment of the supporting element to the reflecting plate according to one preferred embodiment of this invention.
Figure 7:
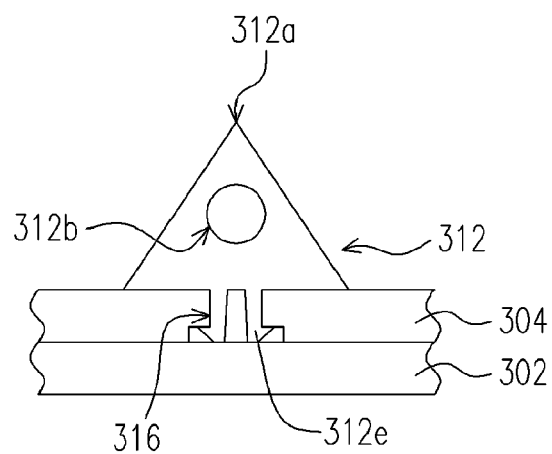
FIG. 7 is a sectional view showing the attachment of the supporting element to the reflecting plate according to another preferred embodiment of this invention.
Figure 8:
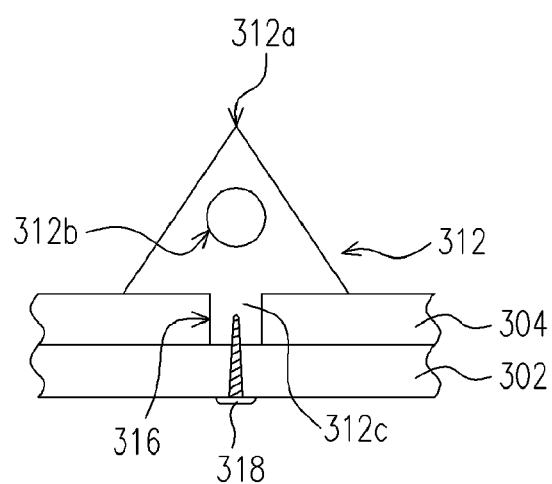
FIG. 8 is a sectional view showing the attachment of the supporting element to the reflecting plate according to another preferred embodiment of this invention.

In this embodiment, the back light module 300 disclosed in FIGS. 3, 4 and 5 is used as an example for the purpose of illustration. However, this invention also permits a back light module having the supporting elements as shown in FIGS. 6 through 8. Moreover, supporting elements having a specific shape as shown in FIGS. 9 and 10 can be used in the back light module to support both the diffusion plate 308 and the lamp 306. In addition, the back light module according to this invention can also be applied to fabricate an active matrix liquid crystal display or a passive matrix liquid crystal display. In other words, the electrode layer on the back light module and the array substrate is not limited to the configuration of matching a common electrode with a pixel electrode. In fact, anyone familiar with the technology may notice that the electrode layer on the back light module and the array substrate can be a plurality of linear electrodes. Furthermore, the linear electrodes on the back light module may extend in a direction perpendicular to the linear electrodes on the array substrate.

In summary, the back light module and the liquid crystal display according to this invention has at least the following advantages: 1. The plurality of supporting elements positioned on the reflecting plate are capable of supporting both the diffusion plate and the lamp, and therefore warping or distortion of the diffusion plate and the lamp can be effectively prevented. Hence, a back light module having desired optical characteristics so that upon integrating the back light module of the present invention into a liquid crystal display, desired display quality can be maintained. 2. A minute gap is set aside separating the supporting elements from the lamp and the diffusion plate in order to contain any distortion of diffusion plate and/or the lamp resulting from thermal expansion/contraction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A back light module, comprising:
   a frame;
   a reflecting plate set on the bottom interior section of the frame;
   at least a lamp set within the frame above the reflecting plate;
   a diffusion plate set over the frame and above the lamp;
   a plurality of optical films set over the diffusion plate; and
   at least a supporting element set between the reflecting plate and the diffusion plate wherein each supporting element has a first supporting section for supporting the diffusion plate and a second supporting section for supporting the lamp.

2. The back light module of claim 1, wherein material constituting the supporting element comprises a transparent material.

3. The back light module of claim 1, wherein the first supporting section separates from the diffusion plate by a first distance and the second supporting section separates from the lamp by a second distance.

4. The back light module of claim 1, wherein the supporting element is a conical body having a tip section and a through hole, wherein the tip section of the conical body supports the diffusion plate and the through hole supports the lamp, and wherein a part of the lamp is positioned within the through hole.

5. The back light module of claim 1, wherein the supporting element is a thin triangular body having a tip section and a through hole, wherein the tip section of the thin triangular body supports the diffusion plate and the through hole supports the lamp, and wherein a part of the lamp is positioned within the through hole.

6. The back light module of claim 1, wherein the supporting element is a U-shaped body with two conical branches, wherein the tip section of the conical branches supports the diffusion plate and the interior bottom surface of the U-shaped body supports the lamp.

7. The back light module of claim 1, wherein one end of the supporting element is attached to the reflecting plate through a thermal glue layer.

8. The back light module of claim 1, wherein one end of the supporting element is latched onto a corresponding groove on the reflecting plate.

9. The back light module of claim 1, wherein the supporting element and the reflecting plate are locked together using a screw that passes through the frame and the reflecting plate.

10. A liquid crystal display, comprising:
   a back light module, having:
      a first frame;
      a reflecting plate set up on the bottom interior section of the first frame;
      at least a lamp set within the first frame above the reflecting plate;
      a diffusion plate set over the first frame above the lamp;

a plurality of optical films set over the diffusion plate; and at least a supporting element set between the reflecting plate and the diffusion plate, wherein each supporting element has a first supporting section for supporting the diffusion plate and a second supporting section for supporting the lamp;

a liquid crystal panel above die optical films; and a second frame positioned over the first frame and covering the edges of the liquid crystal panel.

11. The liquid crystal display of claim 10, wherein material constituting the supporting element comprises a transparent material.

12. The liquid crystal display of claim 10, wherein the first supporting section separates from the diffusion plate by a first distance and the second supporting section separates from the lamp by a second distance.

13. The liquid crystal display of claim 10, wherein the supporting body is a conical body having a tip section and a through hole, wherein the tip section of the conical body supports the diffusion plate and the through hole supports the lamp, and wherein a part of the lamp is positioned within the through hole.

14. The liquid crystal display of claim 10, wherein the supporting element is a thin triangular body having a tip section and a through hole, wherein the tip section of the thin triangular body supports the diffusion plate and the through hole supports the lamp, and wherein a part of the lamp is positioned within the through hole.

15. The liquid crystal display of claim 10, wherein the supporting element is a U-shaped body with two conical branches, wherein the tip section of the conical branches supports the diffusion plate and the interior bottom surface of the U-shaped body supports the lamp.

16. The liquid crystal display of claim 10, wherein one end of the supporting element is attached to the reflecting plate through a thermal glue layer.

17. The liquid crystal display of claim 10, wherein one end of the supporting element is latched onto a corresponding groove on the reflecting plate.

18. The liquid crystal display of claim 10, wherein the supporting element and the reflecting plate are locked together using a screw that passes through the frame and the reflecting plate.

* * * * *